(12) United States Patent
Yasumasa (10) Patent No.: US 7,199,734 B1
(45) Date of Patent: Apr. 3, 2007

(54) INFORMATION-PROCESSING APPARATUS INCLUDING WIRELESS COMMUNICATION DEVICE

(75) Inventor: Kaoru Yasumasa, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/333,094

(22) Filed: Jan. 17, 2006

(30) Foreign Application Priority Data

Nov. 2, 2005 (JP) .............................. 2005-319053

(51) Int. Cl.
*H03M 9/00* (2006.01)
(52) U.S. Cl. ...................................... 341/101; 341/100
(58) Field of Classification Search ................ 343/702, 343/715, 873, 906; 361/681, 683; 345/156, 345/168; 341/100, 101
See application file for complete search history.

(56) References Cited

U.S. PATENT DOCUMENTS

| | | | | |
|---|---|---|---|---|
| 6,377,218 | B1 * | 4/2002 | Nelson et al. | 343/702 |
| 6,380,930 | B1 * | 4/2002 | Van Ruymbeke | 345/173 |
| 6,473,046 | B1 * | 10/2002 | Dickie et al. | 343/702 |
| 6,531,985 | B1 * | 3/2003 | Jones et al. | 343/702 |
| 6,809,927 | B2 * | 10/2004 | Ohashi et al. | 361/699 |
| 6,930,669 | B2 * | 8/2005 | Weiner et al. | 345/156 |
| 2002/0002061 | A1 * | 1/2002 | Miyasaka et al. | 455/557 |
| 2002/0111194 | A1 * | 8/2002 | Behbahani et al. | 455/566 |
| 2002/0196599 | A1 * | 12/2002 | Misawa | 361/683 |
| 2006/0045495 | A1 * | 3/2006 | Prabhune et al. | 386/125 |

FOREIGN PATENT DOCUMENTS

JP 04-342010 11/1992

* cited by examiner

Primary Examiner—Linh V. Nguyen
(74) Attorney, Agent, or Firm—RatnerPrestia (57) ABSTRACT

An information-processing apparatus includes a controller for sending a first parallel digital signal having a plurality of bits, a first converter for time-dividing the first parallel digital signal as to convert the first parallel digital signal into a serial signal, a first case for accommodating the controller and the first converter, a second converter for converting the serial signal into a second parallel digital signal having a plurality of bits, a wireless communication device for receiving the second parallel digital signal to producing a high frequency signal based on the second parallel digital signal, an antenna for transmitting the high frequency signal, a second case for accommodating the second converter and the wireless communication device and for having the antenna mounted thereto, a hinge unit coupling the second case rotatably with the first case, and a signal line provided at the hinge unit and transmitting the serial signal between the first converter and the second converter. These information-processing apparatuses can transmit the high frequency signals to the antennas with low losses.

2 Claims, 7 Drawing Sheets

Prior Art

Prior Art

INFORMATION-PROCESSING APPARATUS INCLUDING WIRELESS COMMUNICATION DEVICE

FIELD OF THE INVENTION

The present invention relates to an information-processing apparatus including a wireless communication device.

BACKGROUND OF THE INVENTION

Portable information apparatuses, such as notebook personal computers, are often coupled with networks, such as the Internet, via wireless local area networks (LANs) since having their portability.

Figure 4:
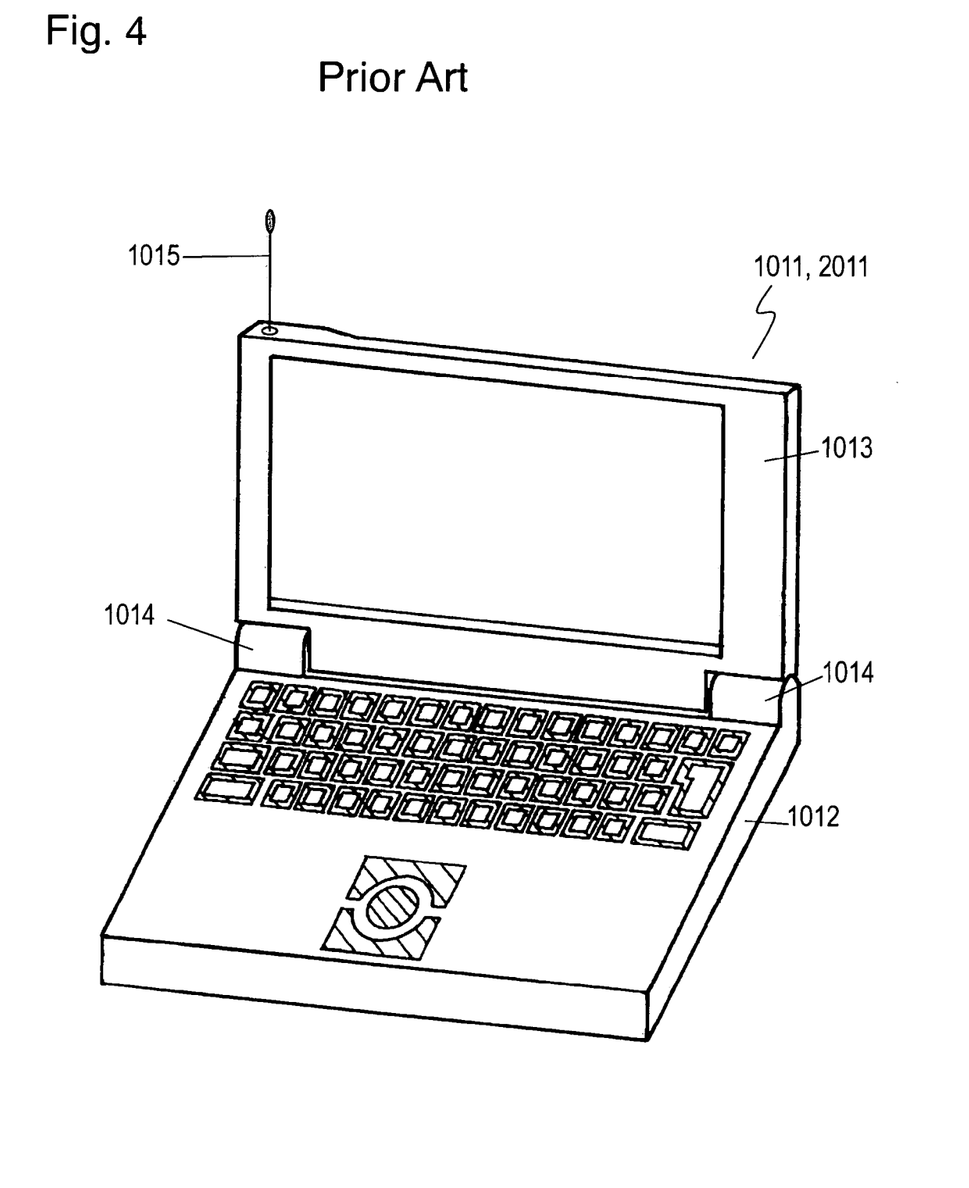
FIG. 4 is a perspective view of conventional information-processing apparatuses.

FIG. 4 is a perspective view of conventional notebook personal computers 1011 and 2011. A whip antenna 1015 is a vertical antenna for a wireless communication of a standard of a digital portable phone, and enables the notebook personal computers to receive the same service as internet-connecting services provided for portable phones. Each of notebook personal computers 1011 and 2011 include display unit 1013 and main body 1012. Hinge unit 1014 couples display unit 1013 with main body 1012 rotatably with respect to main body 1012. Notebook personal computers 1011 and 2011 are folded at hinge unit 1014 while they are not used or are carried. A signal line, a power supply line, and a ground line are provided between main body 1012 and display unit 1013 through hinge unit 1014. A wire, such as flexible wire, having durability against bending is suitable to these lines, but a thick wire which does not have durability against bending is not suitable to them.

Figure 5A:
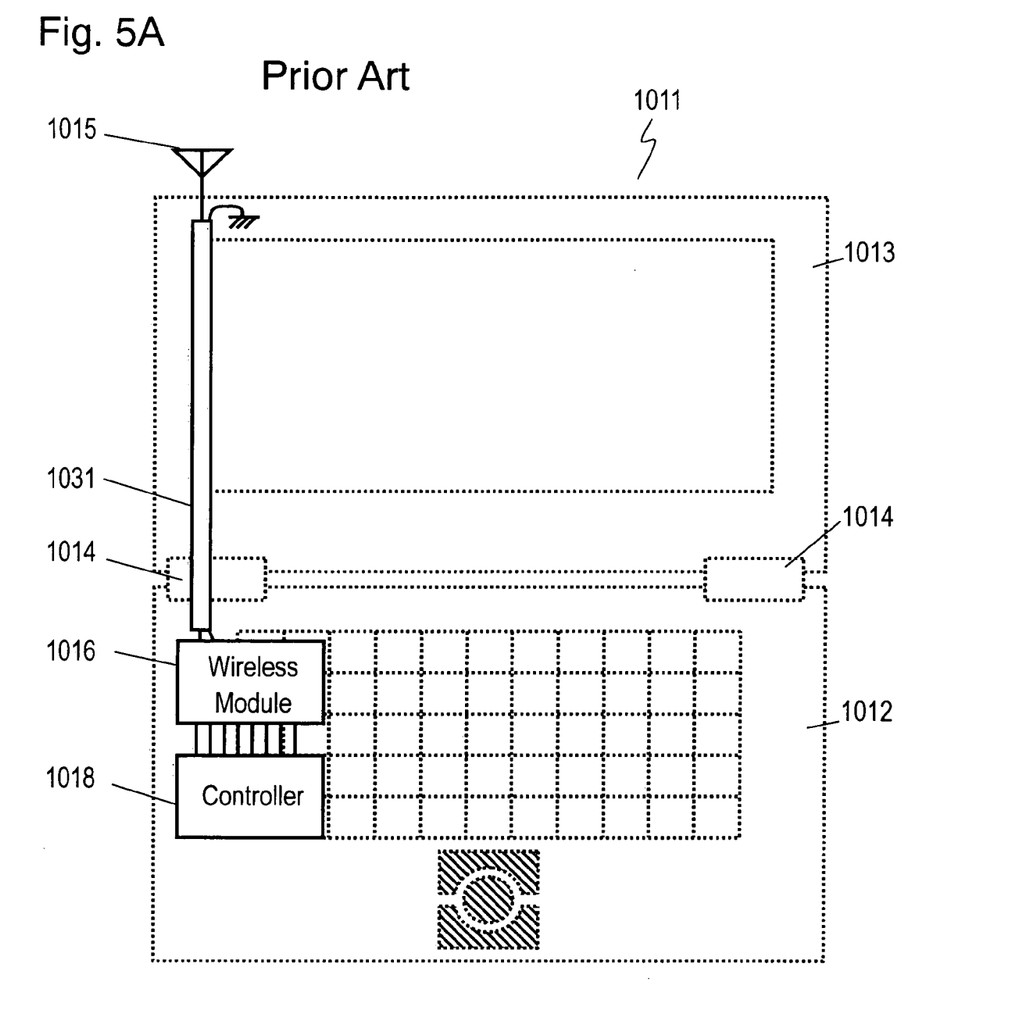
FIG. 5A is a schematic diagram of a conventional information-processing apparatus.

FIG. 5A is a schematic diagram of notebook personal computer 1011. Wireless module 1016 receives high frequency signals at antenna 1015, and demodulates the signals to provide digital signals. Wireless module 1016 modulates signals with digital signals to convert the digital signals into high frequency signals which meet a portable phone network standard, and sends the high frequency signals from antenna 1015. Controller 1018 generates or processes the digital signals, and controls operations, such as the switching of sending/receiving of wireless module 1016, of notebook personal computer 1011. Wireless module 1016 and controller 1018 are located in main body 1012 of notebook personal computers 1011. Antenna 1015 mounted to display unit 1013 is coupled with wireless module 1016 via coaxial cable 1031 passing through hinge unit 1014. Coaxial cable 1031 transmits weak high frequency signals received to wireless module 1016, and transmits the high frequency signals generated by wireless module 1016 to antenna 1015.

Coaxial cable 1031, a cable having a small loss in high frequencies, generally includes a core wire, a braided copper wire surrounding the core wire, a polyethylene insulator insulating the core wire from the braided copper wire, and a vinyl cover surrounding the outer circumference of the braided copper wire. Coaxial cable 1031 is thicker and weaker in bending than an ordinary single wire, accordingly not being suitable to be drawn through hinge unit 1014 and arranged. Coaxial cable 1031 has a small loss. However, according to lengthening a distance between antenna 1015 and wireless module 1016, coaxial cable 1031 has the loss increasing, and is influenced easily by noises from surrounding circuits. Hinge unit 1014 may be made of metal as to provide strength. If a housing of personal computer 1011 is made of metal to provide the strength, an eddy current is generated on a surface of the housing by the high frequency signals transmitted in long coaxial cable 1031, thereby producing losses.

Figure 5B:
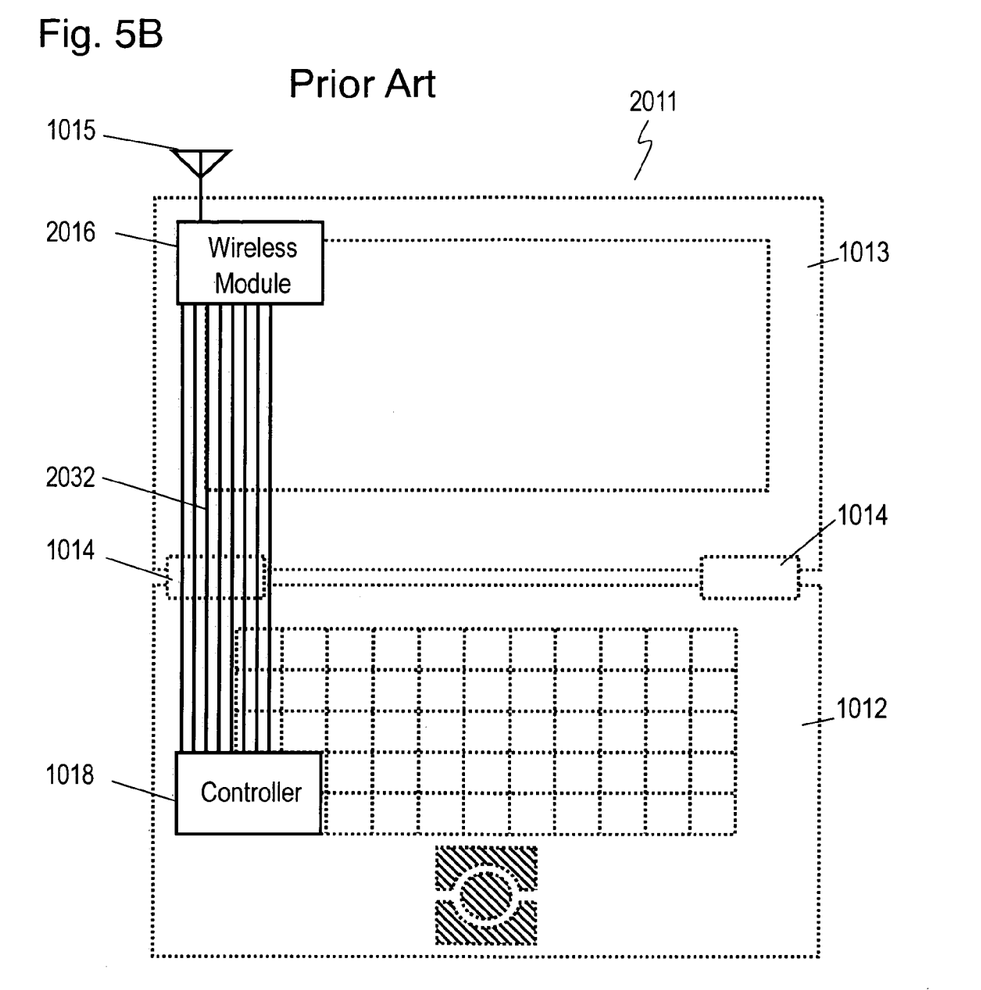
FIG. 5B is a schematic diagram of another conventional information-processing apparatus.

FIG. 5B is a schematic diagram of notebook personal computers 2011. Unlike notebook personal computers 1011 shown in FIG. 5A, in personal computers 2011, wireless module 2016 is located in display unit 1013. Wireless module 2016 and controller 1018 are coupled with each other with plural signal lines 2032 for transmitting digital signals having plural bits or control signals. Furthermore, signal lines 2032 pass through hinge unit 1014. The number of bits of the digital signals is large, and the number of signal lines 2032 becomes accordingly large. Thus, signal lines 2032 may not pass easily through hinge unit 1014 having a predetermined size. In addition, signal lines 2032 are often bound together and arranged within the predetermined size, thereby allowing signals transmitted therein to be interfered with each other.

As shown in FIG. 5B, antenna 1015 and a high frequency circuit are arranged in the upper portion of display unit 1013 for preventing human bodies from influences of the device emitting electromagnetic waves even when the computer is used not only on a desk but also on a lap. In regard to devices emitting electromagnetic waves to human bodies, according to the growth of the market of portable phones, a standard of electromagnetic waves permissible for human bodies has been determined as a specific absorption rate (SAR).

SUMMARY OF THE INVENTION

An information-processing apparatus includes a controller for sending a first parallel digital signal having plural bits, a first converter for time-dividing the first parallel digital signal as to convert the first parallel digital signal into a serial signal, a first case for accommodating the controller and the first converter, a second converter for converting the serial signal into a second parallel digital signal having plural bits, a wireless communication device for receiving the second parallel digital signal to producing a high frequency signal based on the second parallel digital signal, an antenna for transmitting the high frequency signal, a second case for accommodating the second converter and the wireless communication device and for having the antenna mounted thereto, a hinge unit coupling the second case rotatably with the first case, and a signal line provided at the hinge unit and transmitting the serial signal between the first converter and the second converter.

Another information-processing apparatus includes an antenna for receiving a high frequency signal, a wireless communication device for producing a first parallel digital signal having plural bits based on the received high frequency signal, a first converter for time-dividing the first parallel digital signal to convert the first parallel digital signal into a serial signal, a first case for accommodating the first converter and the wireless communication device and for having the antenna mounted thereto, a second converter for converting the serial signal into a second parallel digital signal having plural bits, a controller for receiving the second parallel digital signal, a second case for accommodating the controller and the second converter, a hinge unit coupling the second case rotatably with the first case, and a signal line provided at the hinge unit and transmitting the serial signal between the first converter and the second converter.

These information-processing apparatuses can transmit the high frequency signals to the antennas with low losses.

DETAILED DESCRIPTION OF THE PREFERRED EMBODIMENT

Figure 1:
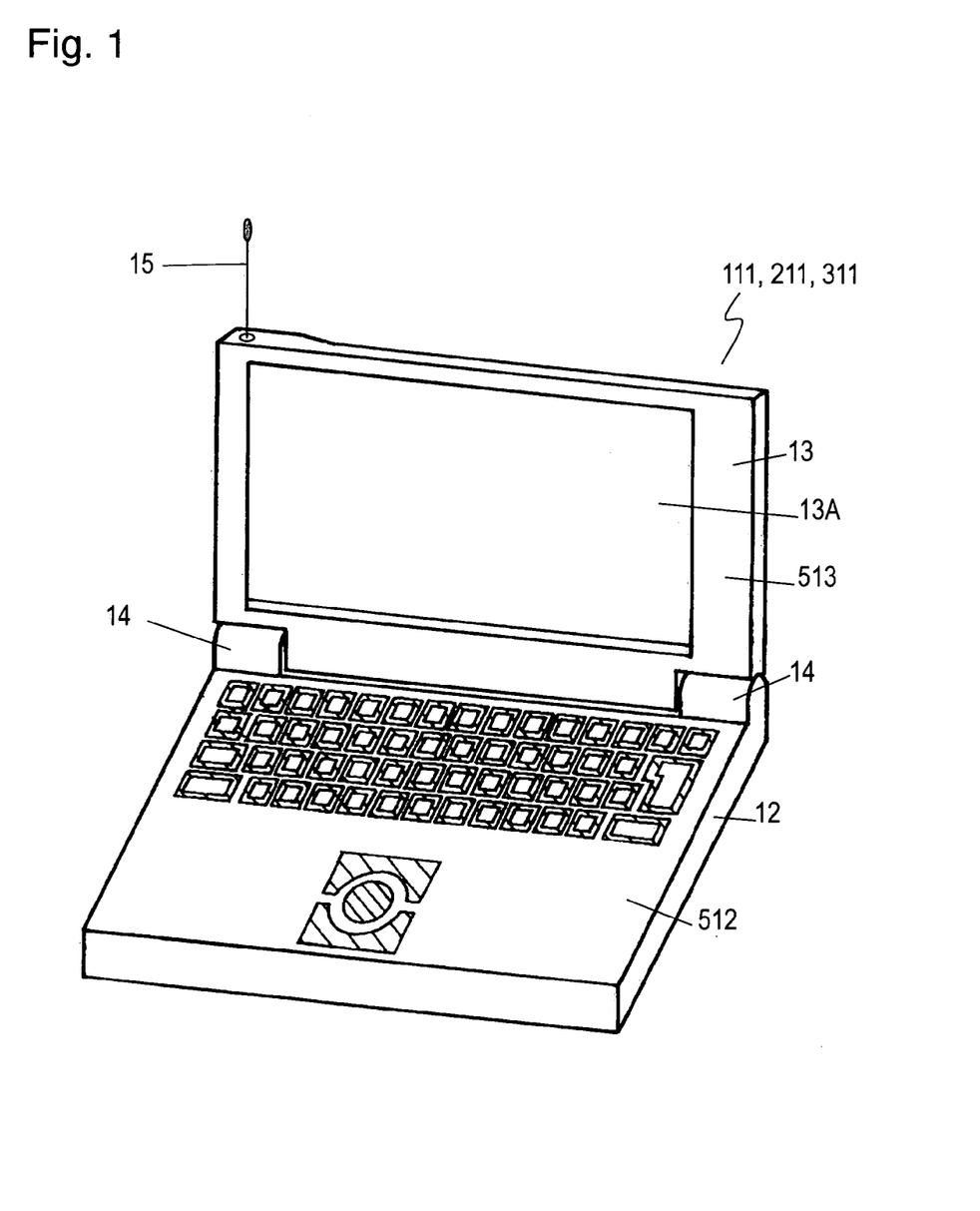
FIG. 1 is a perspective view of an information-processing apparatus in accordance with an exemplary embodiment of the present invention.

FIG. 1 is a perspective view of notebook personal computers 111, 211 and 311, information-processing apparatuses in accordance with an exemplary embodiment of the present invention. Each of notebook personal computers 111, 211 and 311 includes main body and display unit 13 having display device 13A. Display unit 13 and main body 12 include cases 513 and 512, respectively. Whip antenna 15 is a vertical antenna of a wireless communication type used in a standard of a digital portable phone, and enables the computers to receive the same internet connecting service provided for portable phones. Hinge unit 14 couples display unit 13 with main body 12 rotatably with respect to main body 12. That is, hinge unit 14 couples case 513 with case 512 rotatably with respect to case 512. Notebook personal computers 111, 211 and 311 are folded at hinge unit 14 while they are not used or are carried, so that case 512 and case 513 are piled.

Figure 2:
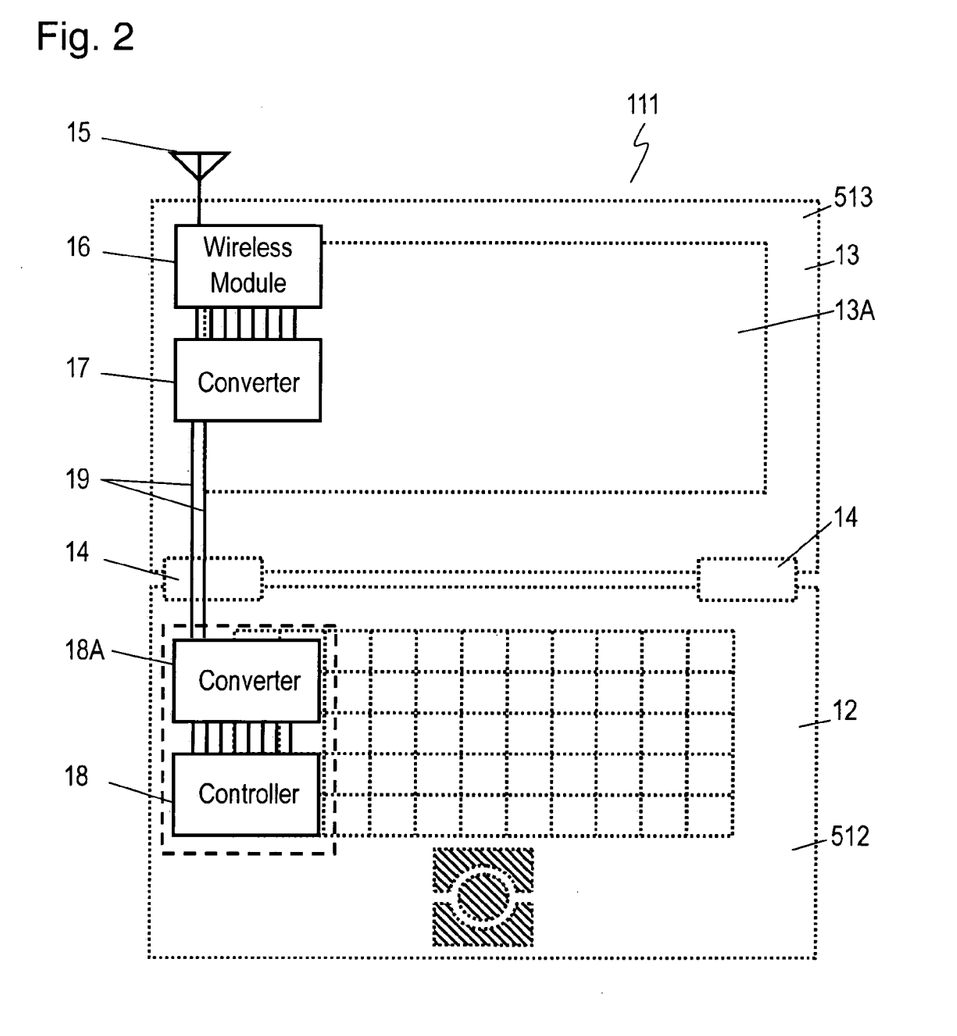
FIG. 2 is a schematic diagram of the information-processing apparatus in accordance with the embodiment.

FIG. 2 is a schematic diagram of notebook personal computer 111. Wireless module 1016, a wireless communication device in accordance with the embodiment, demodulates high frequency signals received at antenna 15 as to provide digital signals, and modulates signals with digital signals to convert the digital signals into high frequency signals which meet a portable phone network standard, and transmits the high frequency signals from antenna 15. Converter 17 converts serial signals into parallel digital signals, and converts parallel digital signals into serial signals. Controller 18 generates and processes the digital signals, and controls operations, such as the switching of sending/receiving of wireless module 16, of notebook personal computers 111. Two signal lines 19 are signal lines of the System Management Bus (SMBus), a two-wire system serial interface standard.

An operation of notebook personal computer 111 transmitting the high frequency signals to the portable phone network will be described below. Controller 18 generates digital signals to be transmitted to the portable phone network and digital controlling signals for controlling wireless module 16. These signals have plural bits to be transmitted simultaneously. Converter 18A time-divides these signals to convert the signals into serial signals based on the SMBus standard, and sends the serial signals to signal lines 19. The serial signals are received at converter 17 via two signal lines 19 passing through hinge unit 14. Converter 17 is a General Purpose I/O (GPIO), a flexible parallel interface permitting various customized connections. The serial signals sent to converter 17 are inversely transformed into original parallel digital signals based on the SMBus standard, thus providing digital signals and control signals necessary for communication. Wireless module 16 is controlled by the control signals, and converts the digital signals into high frequency signals of a portable phone network standard. The high frequency signals are transmitted from antenna 15 as radio waves. Case 513 accommodates wireless module 16, converter 17, and display device 13A. Antenna 15 is mounted to case 513. Case 512 accommodates controller 18 (converter 18A).

An operation of notebook personal computer 111 receiving high frequency signals from the portable phone network. The high frequency signal is received at antenna 15, and converted into a parallel digital signal having plural bits by wireless module 16. Converter 17 converts the parallel digital signal into a serial signal of the SMBus standard, and sends the serial signal to converter 18A of controller 18 via signal lines 19. Converter 18A converts the serial signal into a parallel digital signal having plural bits. Controller 18 controls an operation of notebook personal computer 111 based on the parallel digital signal.

In notebook personal computer 111 according to the present embodiment, controller 18 is coupled with wireless module 16 with a few signal lines 19 at hinge unit 14, and high frequency signals can be efficiently transmitted to antenna 15.

Converters 17 and 18A converts parallel digital signals into serial signals by time-dividing, thereby eliminating problems caused by interference between independent parallel digital signals of plural bits which are not synchronized.

Digital signals which are generated by controller 18 and are necessary for the portable phone network and control signals for controlling wireless module 16 are time-divided and converted into serial signals of the SMBus standard to be transmitted. Controller 18 may include an integrated circuit of GPIO providing converter 18A. In addition, controller 18 may have functions of converter 18A implemented by firmware of a microcomputer.

Communication of serial signals between converters 17 and 18A may not necessarily be limited to the SMBus standard. Signal lines 19 may be three signal lines generally used for another serial communication system, such as full-duplex serial transmission, for transmitting clock, sending data, and receiving data between converters 17 and 18A, respectively.

A parallel digital signal having plural bits which are independent and are not synchronized to each other is time-divided to allow data to be transmitted between controller 18 and wireless module 16, namely, between main body 12 and display unit 13, through signal lines located at hinge unit 14. The number of the bits of the former parallel signal is fewer than that of the latter parallel signal, hence providing the same effect as the present embodiment discussed above. Furthermore, each of notebook personal computers 111, 211 and 311 includes display unit 13 and main body 12. However, respective functions of display unit 13 and main body 12 are not limited to the functions mentioned above. Two portions operating with parallel digital signals are coupled rotatably with each other with hinge unit 14, and the parallel digital signals are converted into serial signals with converters 17 and 18A. Then, the serial signals are transmitted through signal lines 19 passing through hinge unit 14, hence providing the same effect as the present embodiment discussed above.

Figure 3A:
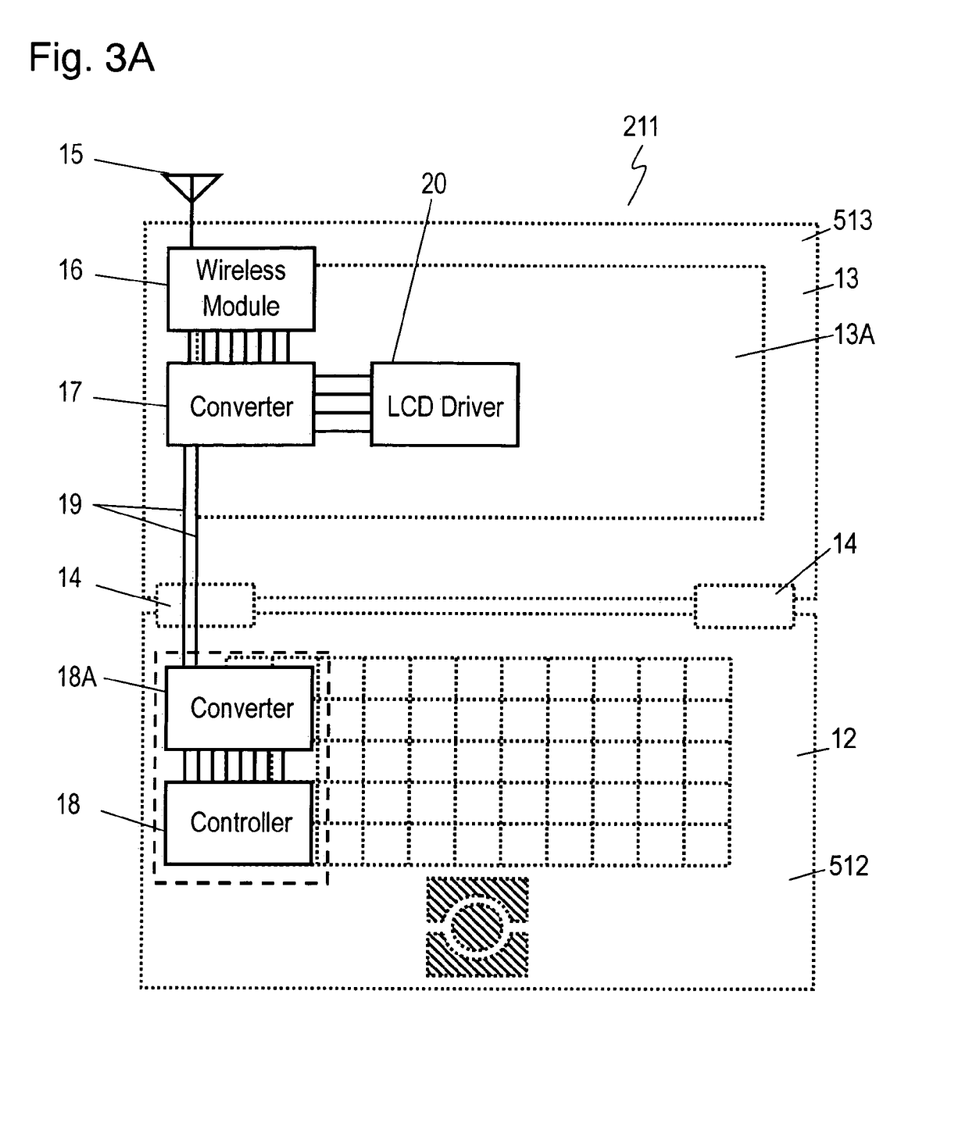
FIG. 3A is a schematic diagram of another information-processing apparatus in accordance with the embodiment.

FIG. 3A is a schematic diagram of notebook personal computer 211, another information-processing apparatus according to the embodiment. A signal for controlling liquid crystal display (LCD) driver 20 for driving display device 13A, such as a liquid crystal display, is transmitted as a serial signal through signal lines 19, thereby decreasing the number of the signal lines passing through hinge unit 14, and accordingly decreasing interference between the signal lines more than parallel digital signals which are not synchronized to each other. The serial signal may be synchronized with a synchronous signal of a video signal displayed on display device 13A, thereby reducing a noise on a screen of display device 13A.

Figure 3B:
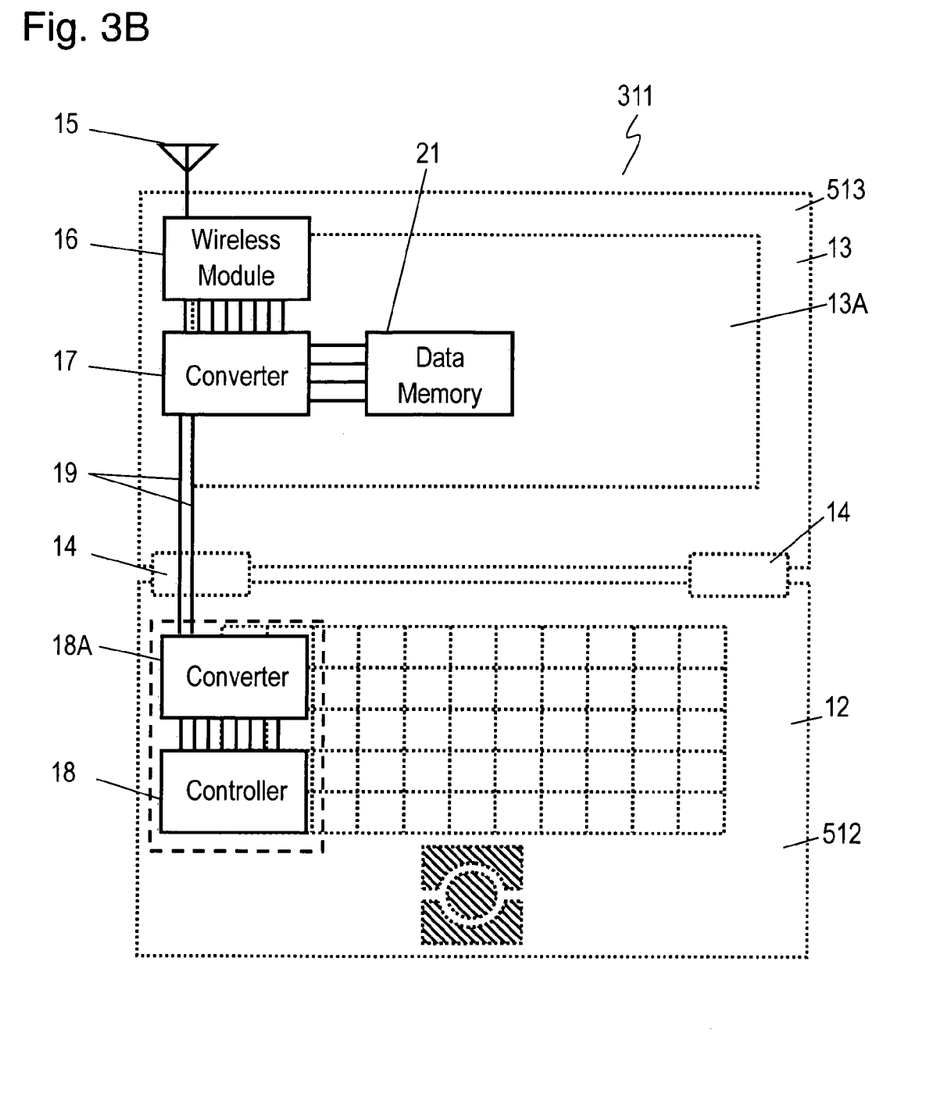
FIG. 3B is a schematic diagram of still another information-processing apparatus in accordance with the embodiment.

FIG. 3B is a schematic diagram of notebook personal computer 311, still another information-processing apparatus according to the embodiment. Notebook personal computer 311 includes data memory 21 coupled with converter 17. Data memory 21 stores signals transmitted between converters 17 and 18A. If a serial signal transmitted in signal lines 19 includes a lot of data, or if the serial signal includes a signal required to be processed at a high speed, data to be processed first or at the high speed may be processed first among data which are transmitted between converters 17 and 18A, and are stored in data memory 21. Data which may be processed later can be processed at a spare time, thus allowing a lot of data to be processed. This operation further decreases the number of the signal lines passing through hinge unit 14.

In notebook personal computers 111, 211, and 311, the information-processing apparatuses of the embodiment, display unit 13 is coupled with main body 12 with few signal lines 19 located at hinge unit 14, and the high frequency signals can be transmitted efficiently to antenna 15.

What is claimed is:

1. An information-processing apparatus comprising:
a controller for sending a first parallel digital signal having a plurality of bits;
a first converter for time-dividing the first parallel digital signal as to convert the first parallel digital signal into a serial signal;
a first case for accommodating the controller and the first converter;
a second converter for converting the serial signal into a second parallel digital signal having a plurality of bits;
a wireless communication device for receiving the second parallel digital signal to producing a high frequency signal based on the second parallel digital signal;
an antenna for transmitting the high frequency signal;
a second case for accommodating the second converter and the wireless communication device and for having the antenna mounted thereto;
a hinge unit coupling the second case rotatably with the first case; and
a signal line provided at the hinge unit and transmitting the serial signal between the first converter and the second converter.

2. An information-processing apparatus comprising:
an antenna for receiving a high frequency signal;
a wireless communication device for producing a first parallel digital signal having a plurality of bits based on the received high frequency signal;
a first converter for time-dividing the first parallel digital signal to convert the first parallel digital signal into a serial signal;
a first case for accommodating the first converter and the wireless module and for having the antenna mounted thereto;
a second converter for converting the serial signal into a second parallel digital signal having a plurality of bits;
a controller for receiving the second parallel digital signal;
a second case for accommodating the controller and the second converter;
a hinge unit coupling the second case rotatably with the first case; and
a signal line provided at the hinge unit and transmitting the serial signal between the first converter and the second converter.

* * * * *